United States Patent
Hillis

(10) Patent No.: US 8,692,792 B2
(45) Date of Patent: *Apr. 8, 2014

(54) BOUNDING BOX GESTURE RECOGNITION ON A TOUCH DETECTING INTERACTIVE DISPLAY

(75) Inventor: W. Daniel Hillis, Encino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/413,594

(22) Filed: Mar. 6, 2012

(65) Prior Publication Data

US 2012/0223971 A1 Sep. 6, 2012

Related U.S. Application Data

(63) Continuation of application No. 12/615,224, filed on Nov. 9, 2009, now Pat. No. 8,139,043, which is a continuation of application No. 11/134,802, filed on May 20, 2005, now Pat. No. 7,719,523, and a continuation-in-part of application No. 10/913,105, filed on Aug. 6, 2004, now Pat. No. 7,728,821.

(60) Provisional application No. 60/647,343, filed on Jan. 25, 2005.

(51) Int. Cl.
*G09G 5/00* (2006.01)

(52) U.S. Cl.
USPC .......................................... 345/173; 715/863

(58) Field of Classification Search
USPC .................... 345/173–178; 178/18.01–18.11; 715/863; 382/181, 182, 184, 187, 189
See application file for complete search history.

(56) References Cited

U.S. PATENT DOCUMENTS

| 3,478,220 A | 11/1969 | Milroy |
| 3,673,327 A | 6/1972 | Johnson |

(Continued)

FOREIGN PATENT DOCUMENTS

| EP | 0881592 B2 | 10/2002 |
| EP | 0881591 B1 | 9/2003 |
| JP | 2001175807 | 6/2001 |
| WO | 0216905 A2 | 2/2002 |

OTHER PUBLICATIONS

"U.S. Appl. No. 12/615,224 Notice of Allowance mailed Aug. 1, 2011", 8.

(Continued)

*Primary Examiner* — Jimmy H Nguyen
(74) *Attorney, Agent, or Firm* — Michael Johnson

(57) ABSTRACT

A method and apparatus for identifying user gestures to control an interactive display identifies gestures based on a bounding box enclosing points at which a user contacts a touch sensor corresponding with the display surface and permits use of inexpensive and highly reliable grid-based touch sensors that provide a bounding box to describe contact information. In identifying gestures, position, motion, shape, and deformation of the bounding box may be considered. Center, width, height, aspect ratio, length and orientation of the bounding box diagonal may be determined. A stretch factor, defined as the maximum of the ratio of the height of the bounding box to the width of the bounding box and the ratio of the width of the bounding box to the height of the bounding box, may also be computed. Gestures may be identified based on the changes in time of these characteristics and quantities.

7 Claims, 2 Drawing Sheets

(56) References Cited

U.S. PATENT DOCUMENTS

| | | |
|---|---|---|
| 3,764,813 A | 10/1973 | Clement |
| 3,775,560 A | 11/1973 | Ebeling |
| 3,860,754 A | 1/1975 | Johnson |
| 4,144,449 A | 3/1979 | Funk |
| 4,245,634 A | 1/1981 | Albisser |
| 4,247,767 A | 1/1981 | O'Brien |
| 4,463,380 A | 7/1984 | Hooks, Jr. |
| 4,507,557 A | 3/1985 | Tsikos |
| 4,517,559 A | 5/1985 | Deitch |
| 4,527,240 A | 7/1985 | Kvitash |
| 4,722,053 A | 1/1988 | Dubno |
| 4,742,221 A | 5/1988 | Sasaki |
| 4,746,770 A | 5/1988 | McAvinney |
| 4,782,328 A | 11/1988 | Denlinger |
| 5,105,186 A | 4/1992 | May |
| 5,239,373 A | 8/1993 | Tang et al. |
| 5,379,238 A | 1/1995 | Stark |
| 5,436,639 A | 7/1995 | Arai et al. |
| 5,448,263 A | 9/1995 | Martin |
| 5,483,261 A | 1/1996 | Yasutake |
| 5,512,826 A | 4/1996 | Hardy et al. |
| 5,528,263 A | 6/1996 | Platzker |
| 5,971,922 A | 10/1999 | Arita et al. |
| 5,982,352 A | 11/1999 | Pryor |
| 6,008,798 A | 12/1999 | Mato, Jr. |
| 6,057,845 A | 5/2000 | Dupouy |
| 6,141,000 A | 10/2000 | Martin |
| 6,215,477 B1 | 4/2001 | Morrison |
| 6,232,957 B1 | 5/2001 | Hinckley |
| 6,240,306 B1 | 5/2001 | Rohrscheib et al. |
| 6,280,381 B1 | 8/2001 | Malin et al. |
| 6,297,838 B1 | 10/2001 | Chang et al. |
| 6,309,884 B1 | 10/2001 | Cooper et al. |
| 6,333,753 B1 | 12/2001 | Hinckley |
| 6,335,722 B1 | 1/2002 | Tani et al. |
| 6,335,724 B1 | 1/2002 | Takekawa |
| 6,337,681 B1 | 1/2002 | Martin |
| 6,352,351 B1 | 3/2002 | Ogasahara |
| 6,379,301 B1 | 4/2002 | Worthington et al. |
| 6,384,809 B1 | 5/2002 | Smith |
| 6,414,671 B1 | 7/2002 | Gillespie |
| 6,415,167 B1 | 7/2002 | Blank et al. |
| 6,421,042 B1 | 7/2002 | Omura |
| 6,429,856 B1 | 8/2002 | Omura |
| 6,442,578 B1 | 8/2002 | Forcier |
| 6,487,429 B2 | 11/2002 | Hockersmith et al. |
| 6,504,532 B1 | 1/2003 | Ogasahara |
| 6,512,936 B1 | 1/2003 | Monfre et al. |
| 6,518,959 B1 | 2/2003 | Ito |
| 6,528,809 B1 | 3/2003 | Thomas et al. |
| 6,531,999 B1 | 3/2003 | Trajkovic |
| 6,532,006 B1 | 3/2003 | Takekawa |
| 6,563,491 B1 | 5/2003 | Omura |
| 6,594,023 B1 | 7/2003 | Omura |
| 6,608,619 B2 | 8/2003 | Omura et al. |
| 6,636,635 B2 | 10/2003 | Matsugu |
| 6,651,061 B2 | 11/2003 | Unchida et al. |
| 6,654,007 B2 | 11/2003 | Ito |
| 6,654,620 B2 | 11/2003 | Wu et al. |
| 6,675,030 B2 | 1/2004 | Ciurczak et al. |
| 6,723,929 B2 | 4/2004 | Kent |
| 6,747,636 B2 | 6/2004 | Martin |
| 6,764,185 B1 | 7/2004 | Beardsley |
| 6,765,558 B1 | 7/2004 | Dotson |
| 6,788,297 B2 | 9/2004 | Itoh et al. |
| 6,791,700 B2 | 9/2004 | Omura |
| 6,803,906 B1 | 10/2004 | Morrison |
| 6,810,351 B2 | 10/2004 | Katsurahira |
| 6,825,890 B2 | 11/2004 | Matsufusa |
| 6,828,959 B2 | 12/2004 | Takekawa |
| 6,885,883 B2 | 4/2005 | Parris et al. |
| 6,888,536 B2 | 5/2005 | Westerman |
| 6,922,642 B2 | 7/2005 | Sullivan |
| 6,998,247 B2 | 2/2006 | Monfre et al. |
| 6,999,061 B2 | 2/2006 | Hara et al. |
| 7,339,580 B2 | 3/2008 | Westerman et al. |
| 7,342,574 B1 | 3/2008 | Fujioka |
| 7,411,575 B2 | 8/2008 | Hill et al. |
| 7,474,296 B2 | 1/2009 | Obermeyer et al. |
| 7,519,223 B2 | 4/2009 | Dehlin et al. |
| 7,719,523 B2 * | 5/2010 | Hillis .................... 345/173 |
| 7,724,242 B2 | 5/2010 | Hillis |
| 7,728,821 B2 | 6/2010 | Hillis et al. |
| 7,743,348 B2 | 6/2010 | Robbins et al. |
| 8,072,439 B2 | 12/2011 | Hillis et al. |
| 8,139,043 B2 * | 3/2012 | Hillis .................... 345/173 |
| 8,188,985 B2 | 5/2012 | Hillis et al. |
| 8,269,739 B2 | 9/2012 | Hillis et al. |
| 2001/0016682 A1 | 8/2001 | Berner et al. |
| 2001/0019325 A1 | 9/2001 | Takekawa |
| 2001/0022579 A1 | 9/2001 | Hirabayashi |
| 2001/0026268 A1 | 10/2001 | Ito |
| 2002/0019022 A1 | 2/2002 | Dunn et al. |
| 2002/0036617 A1 | 3/2002 | Pryor |
| 2002/0132279 A1 | 9/2002 | Hockersmith |
| 2002/0185981 A1 | 12/2002 | Dietz et al. |
| 2003/0001825 A1 | 1/2003 | Omura et al. |
| 2003/0063775 A1 | 4/2003 | Rafii et al. |
| 2003/0137494 A1 | 7/2003 | Tulbert |
| 2003/0214481 A1 | 11/2003 | Xiong |
| 2003/0231167 A1 | 12/2003 | Leung |
| 2004/0033618 A1 | 2/2004 | Haass et al. |
| 2004/0046744 A1 | 3/2004 | Rafii et al. |
| 2004/0106163 A1 | 6/2004 | Workman et al. |
| 2005/0038674 A1 | 2/2005 | Braig et al. |
| 2005/0052427 A1 | 3/2005 | Wu et al. |
| 2005/0106651 A1 | 5/2005 | Chaiken et al. |
| 2006/0010400 A1 | 1/2006 | Dehlin et al. |
| 2006/0022955 A1 | 2/2006 | Kennedy |
| 2006/0026521 A1 | 2/2006 | Hotelling |
| 2006/0026536 A1 | 2/2006 | Hotelling et al. |
| 2006/0031786 A1 | 2/2006 | Hillis |
| 2006/0063218 A1 | 3/2006 | Bartkowiak et al. |
| 2007/0252821 A1 | 11/2007 | Hollemans et al. |
| 2007/0268273 A1 | 11/2007 | Westerman et al. |
| 2008/0211785 A1 | 9/2008 | Hotelling et al. |
| 2010/0234638 A1 | 9/2010 | Fitzpatrick |
| 2012/0206393 A1 | 8/2012 | Hillis et al. |
| 2012/0331415 A1 | 12/2012 | Hillis et al. |
| 2013/0082967 A1 | 4/2013 | Hillis et al. |

OTHER PUBLICATIONS

"Smart Board for Flat Panel Displays (interactive Overlay)", Smart Technologies Inc., Nov. 2003, Total of 2 pages.

Essenther, et al., "Diamond Touch Applications", NCSA (Nat'l Center for Supercomputing Applications), Johnson and Curis, Univ. of Illinois, Diamond Touch for Multi-User Multi-Touch Applications-ACM Conference on Computer Supported Cooperative Work, Nov. 2002 (CSCW 2002, TR2002-048), Nov. 2002.

Johnston, Douglas M. et al., "GM Slab Function", NCSA (National Center for Supercomputing Applications), Univ. of Illinois, Jul. 10, 2003, Total of 5 pages.

Paradiso, Joe et al., "The Laser Wall", MIT Media Lab, Retrived from website: http://web.media.mit.edu/~joep/SpectrumWeb/captions/Laser.html, Sep. 1997, Total of 3 pages.

Rekimoto, Jun, "SmartSkin: An Infrastructure for Freehand Manipulation on Interactive Surfaces", Interaction Laboratory Sony Computer Science Laboratories, Inc., CHI 2002; Retrieved from website: http://www.csl.sony.co.jp/person/rekimoto/smartskin/, Apr. 2002, 1-11.

Ryall, K et al., "Diamond Touch Applications", Mitsubishi Electric Research Laboratories, Aug. 2, 2004, Total of 2 pages.

Small, Charles H., "Touchscreens Provide a Robust and Intuitive User Interface", TechOnline, Retrived from website: www.techonline.com/showArticle.jhtml?articleID=192200401&queryText=touch+screen, May 24, 2002, 1-6.

Wu, et al., "Gesture Registration, Relaxation, and Reuse for Multi-Point Direct-Touch Surfaces", Proceedings of IEEE International Workshop on Horizontal Interactive Human-Computer Systems, Adelaide, South Australia, Jan. 2006, Total of 8 pages.

(56) References Cited

OTHER PUBLICATIONS

Wu, Mike et al., "Multi-Finger and Whole Hand Gestural Interaction Techniques for Multi-User Tabletop Displays", ACM, CHI Letters, vol. 5 No. 2; ACM UIST 2003 Symposium on User interface Software & Technology; Vancouver, Canada;, Nov. 2003, 193-202.

Bennion, N. et al., "Alternate Site Glucose Testing: A Crossover Design," Diabetes Technology & Therapeutics, 2002, vol. 4 (1), pp. 25-33.

Blank T.B., et al., "Clinical Results from a Noninvasive Blood Glucose Monitor," Proceedings of SPIE, Optical Diagnostics and Sensing of Biological Fluids and Glucose and Cholesterol Monitoring II, May 23, 2002, vol. 4624. pp. 1-10.

"Diabetes Statistics," Nov. 1997, Publication No. 98-3926, National Institutes of Health, Bethesda.

Esenther, et al., "Diamond Touch SDK: Support for Multi-User, Multi-Touch Applications," Mitsubishi Electric Research Laboratories, TR2002-048, Nov. 2002, 5 Pages.

Fischer J.S., et al., "Comparisons of Capillary Blood Glucose Concentrations from the Fingertips and the Volar Aspects of the Left and Right Forearm", Instrumentations Metrics, Inc., American Diabetes Association, 62 Annual Meeting, Jun. 14, 2002.

"Functionality: Introduction, Functionality: Console Display, NCSA-GMSlab Team," NCSA(National Center for Supercomputing Applications), Mississippi River Web Museum Consortium, University of Illinois, 2003.

Hazen K.H., et al., "Glucose Determination in Biological Matrices Using Near-Infrared Spectroscopy," 1995, Doctoral Dissertation, University of Iowa.

Jungheim K., et al., "Glucose Monitoring at the Arm," Diabetes Care, Jun. 2002, vol. 25 (6), pp. 956-960.

Jungheim K., et al., "Risky Delay of Hypoglycemia Detection by Glucose Monitoring at the Arm," Diabetes Care, Jul. 2001, vol. 24 (7), pp. 1303-1304.

Khalil O.S., "Spectroscopic and Clinical Aspects of Noninvasive Glucose Measurements," Clinical Chemistry, 1999, vol. 45 (2), pp. 165-177.

Klonoff D.C., "Noninvasive Blood Glucose Monitoring," Mar. 1997, Diabetes Care, vol. 20 (3), pp. 433-437.

Lee D.M., et al., "A Study of Forearm Versus Finger Stick Glucose Monitoring," Diabetes Technology & Therapeutics, 2001, vol. 4 (1), pp. 13-23.

Malin S.F., et al., "Noninvasive Prediction of Glucose by Near Infrared Spectroscopy", Clinical Chemistry, 1999, vol. 45 (9), pp. 1651-1658.

Matt W., et al., "Alternative Site: Fingertip vs. Forearm", Instrumentation Metrics, Inc., Internal Report, Dec. 12, 2001.

McGarraugh G., et al., "Glucose Measurements Using Blood Extracted from the Forearm and Finger," TheraSense, Inc., ART010022 Rev. C, 2001.

McGarraugh G., et al., "Physiological Influences on Off-Finger Glucose Testing," Diabetes Technology & Therapeutics, 2001, vol. 3 (3), pp. 367-376.

McGarraugh G., "Response to Jungheim and Koschinsky," Comments and Responses, Diabetes Care, Jul. 2001, vol. 24 (7), pp. 1304-1306.

Monfre S.L., et al., "Physiologic Differences between Volar and Dorsal Capillary Forearm Glucose Concentrations and Finger Stick Concentrations in Diabetics", Instrumentations Metrics, Inc., American Diabetes Association, 62 Annual Meeting, Jun. 14, 2002.

National Center for Supercomputing Applications (NCSA) Overview; Mississippi RiverWeb Museum Consortium; Jun. 13, 2005; Johnson and Curtis Univ. of Illinois.

NCSA (National Center for Supercomputing Applications); GM Slab Console; Museum Consortium; Jul. 10, 2003, Jhonson and Curtis University of Illinois.

NCSA (National Center for Supercomputing Applications); GM Slab Function; Museum Consortium; Jul. 10, 2003, Jhonson and Curtis University of Illinois.

Peled N., et al., "Comparison of Glucose Levels in Capillary Blood Samples from a Variety of Body Sites", Diabetes Technology & Therapeutics, 2002, vol. 4 (1), pp. 35-44.

Peripheral Circulation, Johnson P.C. Ed., New York, 1978, pp. 198.

Ryan T.J., "A Study of the Epidermal Capillary Unit in Psoriasis", Dermatologica, 1969, vol. 138, pp. 459-472.

Small C., "Touchscreens Provide a Robust and Intuitive User Interface," TechOnline, 1996-2005.

Sparks H.V., "Skin and Muscle", Peripheral Circulation, New York, 1978, pp. 193-230.

Summary Minutes of the Clinical Chemistry and Clinical Toxicology Devices Meeting, Oct. 29, 2001.

Supplementary Search Report—EP06760190, Search Authority—Munich Patent Office—May 31, 2012.

Szuts, Ete Z., et al., "Blood Glucose Concentrations of Arm and Finger During Dynamic Glucose Conditions", Diabetes Technology & Therapeutics, 2002, vol. 4 (1), pp. 3-11.

Tamada J.A., et al., "Noninvasive Glucose Monitoring Comprehensive Clinical Results", Journal of the American Medical Association, 1999, vol. 282 (19), pp. 1839-1844.

The Diabetes Control and Complications Trial Research Group, "The Effect of Intensive Treatment of Diabetes on the Development and Progression of Long-Term Complication in Insulin-Dependent Diabetes Mellitus", The New England Journal of Medicine, 1993, vol. 329 (14), pp. 997-986.

U.K. Prospective Diabetes Study (UKPDS) Group, "Intensive Blood-Glucose Control with Sulphonylureas or Insulin Compared with Conventional Treatment and Risk of Complications in Patients with Type 2 Ddiabetes (UKPDS 33)," The Lancet, vol. 352, Sep. 12, 1998, pp. 837-853.

Wu M., et al., "Gesture Registration, Relation, and Reuse for Multi-Point Direct-Touch Surfaces," in Proceedings of IEEE Tabletop 2006 Conference on Horizontal Interactive Human-Computer Systems, Adelaide, South Australia, 2003, 8 pages.

Yasuo O., et al., "Intensive Insulin Therapy Prevents the Progression of Diabetic Microvascular Complications in Japanese Patients with Non-Insulin-Dependent Diabetes Mellitus: A Randomized Prospective 6-year Study," Diabetes Research and Clinical Practice, 1995, vol. 28, pp. 103-117.

Zheng P., et al., "Noninvasive Glucose Determination by Oscillating Thermal Gradient Spectrometry," Diabetes Technology & Therapeutics, 2000, vol. 2 (1), pp. 17-25.

Zlatko T., et al., "Open-Flow Microperfusion of Subcutaneous Adipose Tissue for On-Line Continuous Ex Vivo Measurement of Glucose Concentration," Diabetes Care, Jul. 1997, vol. 20 (7), pp. 1114-1120.

Zlatko T., et al., "Portable Device for Continuous Fractionated Blood Sampling and Continuous Ex Vivo Blood Glucose Monitoring", Biosensors & Bioelectronics, 1996, vol. 11 (5), pp. 479-487.

* cited by examiner

PAN

ZOOM

ROTATE

BOUNDING BOX GESTURE RECOGNITION ON A TOUCH DETECTING INTERACTIVE DISPLAY

CROSS REFERENCE TO RELATED APPLICATIONS

This application is a continuation of U.S. patent application Ser. No. 12/615,224, filed Nov. 9, 2009 now U.S. Pat. No. 8,139,043, which application is incorporated herein in its entirety by this reference thereto.

U.S. patent application Ser. No. 12/615,224 is a continuation of U.S. patent application Ser. No. 11/134,802, now U.S. Pat. No. 7,719,523, filed May 20, 2005, which claims benefit of U.S. provisional application Ser. No. 60/647,343, filed Jan. 25, 2005: and is a continuation-in-part of U.S. patent application Ser. No. 10/913,105, filed Aug. 6, 2004 now U.S. Pat. No. 7,728,821, all of which are incorporated herein in their entirety by this reference thereto.

BACKGROUND

1. Technical Field

The invention relates to interactive displays. More particularly, the invention relates to a method and apparatus for determining user gestures to control a touch detecting, interactive display.

2. Description of the Prior Art

There are many situations in which one or more individuals interactively explore image-based data. For example, a team of paleontologists may wish to discuss an excavation plan for a remote dig site. To do so, they wish to explore in detail the geographic characteristics of the site as represented on digitized maps. In most laboratories, this requires the team either to huddle around a single workstation and view maps and images on a small display, or sit at separate workstations and converse by phone. The activity of exploring imagery is much more easily and effectively accomplished with the users surrounding a single large display. A particularly effective approach is a touch detecting, interactive display such as that disclosed in the related patent application entitled Touch Detecting Interactive Display, filed 2004 Aug. 6, Ser. No. 10/913,105. In such a system, an image is produced on a touch detecting display surface. A touch sensor determines the locations at which a user contacts the display surface, and based on the position and motions of these locations, user gestures are determined. The display is then updated based on the determined user gestures.

A wide variety of mechanisms are available for determining the locations at which a user contacts the touch sensor. Often, a grid-based approach is used in which measurements acquired on the perimeter of the touch sensor indicate a horizontal coordinate $x_1$ and a vertical coordinate $y_1$ for each contact location.

FIG. 1 shows a schematic diagram that shows a prior art infrared break-beam, grid-based touch sensor for determining the coordinates of two contact locations. The approach shown is similar to that disclosed in U.S. Pat. No. 3,478,220 to Milroy, U.S. Pat. No. 3,764,813 to Clement et al., U.S. Pat. No. 3,775,560 to Ebeling et al., and U.S. Pat. No. 3,860,754 to Johnson et al. These systems incorporate a series of horizontal and vertical beams generated by infrared LED's and a corresponding series of infrared sensors. In FIG. 1, a point of contact $C_1$ interrupts the beam of light passing from an emitter $E_{1x}$ to a sensor $S_{1x}$ and the beam of light passing from an emitter $E_{1y}$ to a sensor $S_{1y}$. A similar interruption of beams is created by a contact point $C_2$. The locations of the contact points $(x_1,y_1)$ and $(x_2,y_2)$ are determined by considering the x and y locations of the interrupted beams. A well known shortcoming of this approach to determining contact locations is a ghosting effect in which the pair of contact locations $C_1$ and $C_2$ cannot be distinguished from the pair of contact locations $C_{1'}$ and $C_{2'}$. Accordingly, the contact information returned by grid-based touch sensor is best considered as a bounding box defined by the rectangle $C_1C_{1'}C_2C_{2'}$.

This method of determining and reporting the locations of contacts differentiates grid-based sensors from many other touch sensor technologies such as the Synaptics TouchPad™ found on many laptop computers. By measuring changes in capacitance near a wire mesh, the TouchPad™ determines contact positions directly and reports an absolute position to the host device. Clearly, an ability to directly ascertain and report the position of a contact is in many situations advantageous. However, capacitive sensors do not scale well, and are therefore impractical or prohibitively expensive for incorporation into large interactive displays.

A number of methods have been proposed for recognizing user gestures through tracking the position and motion of one or more contact locations determined by a touch sensor. Clearly, these methods encounter difficulty when used in conjunction with a grid-based sensor that cannot disambiguate the location of multiple simultaneous contact points. It would thus be advantageous to define a set of user gestures in terms of the bounding box surrounding the detected contact locations. Such a set of user gestures would permit the use of inexpensive, highly reliable, and highly scalable grid-based touch sensors yet still allow users to interact with the display in an intuitive manner.

SUMMARY

The invention provides a method and apparatus for identifying gestures performed by a user to control an interactive display. The gestures are identified based on a bounding box enclosing the points at which a user contacts a touch sensor corresponding with the display surface. The invention thus permits the use of inexpensive and highly reliable grid-based touch sensors that provide a bounding box to describe contact information. In identifying the gestures, the position, motion, shape, and deformation of the bounding box may all be considered. In particular, the center, width, height, aspect ratio, length of the diagonal, and orientation of the diagonal of the bounding box may be determined. A stretch factor, defined as the maximum of the ratio of the height of the bounding box to the width of the bounding box and the ratio of the width of the bounding box to the height of the bounding box, may also be computed. Finally, gestures may be identified based on the changes in time of these characteristics and quantities.

Gestures that may be identified include pan, zoom, and rotate gestures. Display commands that may be associated with the identified gestures include, panning, zooming, and rotation commands that, when executed, provide a translation, a change in the magnification, or a change in the orientation of the displayed imagery. In a preferred embodiment of the invention, a pan gesture is identified only if the motion of the bounding box is greater than a predetermined motion threshold and the deformation of the bounding box is less than a predetermined deformation threshold. A zoom gesture is identified only if the stretch factor is greater than a predetermined stretch threshold and is increasing. A rotate gesture is identified only if the deformation of the bounding box is greater than a predetermined deformation threshold. Ambiguity in the direction of rotation implied by a rotate gesture is resolved by a convention in which the bounding box is specified with a particular pair of opposing corners, e.g. lower left and upper right, determining the relative intensity of contact locations, or measuring the torque applied by the user to the display surface.

DETAILED DESCRIPTION

The invention provides a method and apparatus for identifying gestures performed by a user to control an interactive display. The gestures are identified based on a bounding box enclosing the points at which a user contacts a touch sensor corresponding with the display surface. The invention thus permits the use of inexpensive and highly reliable grid-based touch sensors that provide a bounding box to describe contact information.

Figure 2:
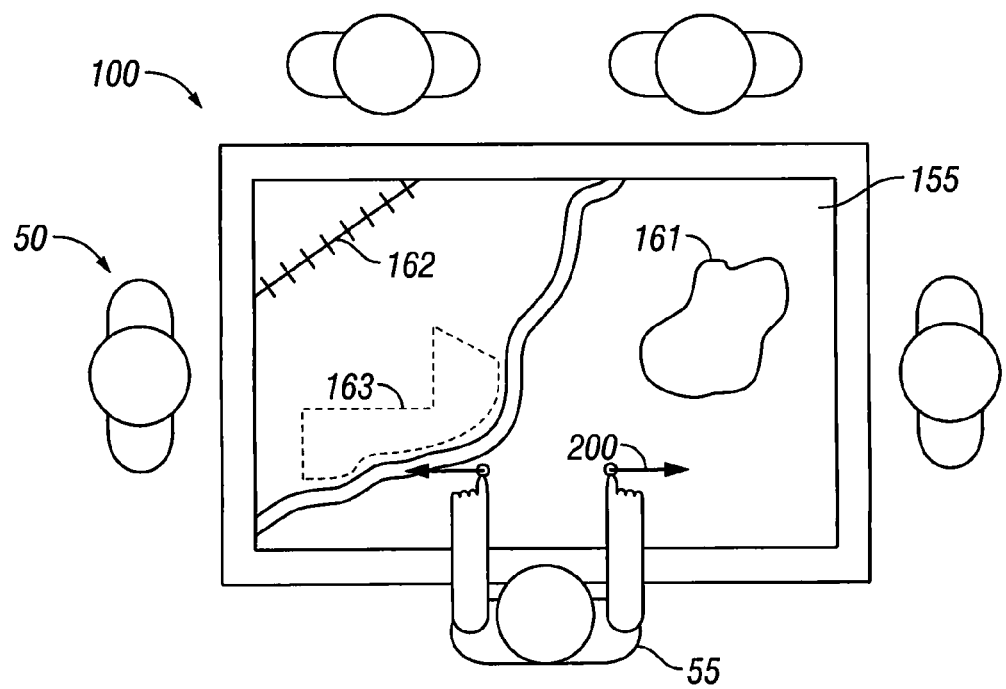
FIG. 2 shows is a schematic diagram that shows several users operating an exemplary interactive display in which the invention may be used.

FIG. 2 shows a schematic diagram that shows several users operating an exemplary interactive display in which the invention may be used. The users 50 surround the display 100 such that each can view the display surface 150, which shows imagery of interest to the users. For example, the display may present Geographic Information System (GIS) imagery characterized by geographic 161, economic 162, political 163, and other features, organized into one or more imagery layers. Because the users can comfortably surround and view the display, group discussion and interaction with the display is readily facilitated.

Corresponding to the display surface is a touch sensor 155 that is capable of detecting when and where a user touches the display surface. Based upon the contact information provided by the touch sensor, user gestures are identified, and a command associated with the user gesture is determined. The command is executed, altering the displayed imagery in the manner requested by the user via the gesture. For example, in FIG. 2, a user 55 gestures by placing his fingertips on the display surface and moving them in an outwardly separating manner. This particular gesture 200 is preferably associated with an inward zoom command. When the zoom command is executed, the display provides a closer, more detailed view of the displayed imagery.

In the preferred embodiment of the invention the touch sensor and the display are physically coincident as shown In FIG. 2. This may be achieved, for example, by projecting imagery onto a horizontal touch sensor with an overhead projector. However, in alternative embodiments of the invention, the touch sensor and display are physically separate.

Figure 1:
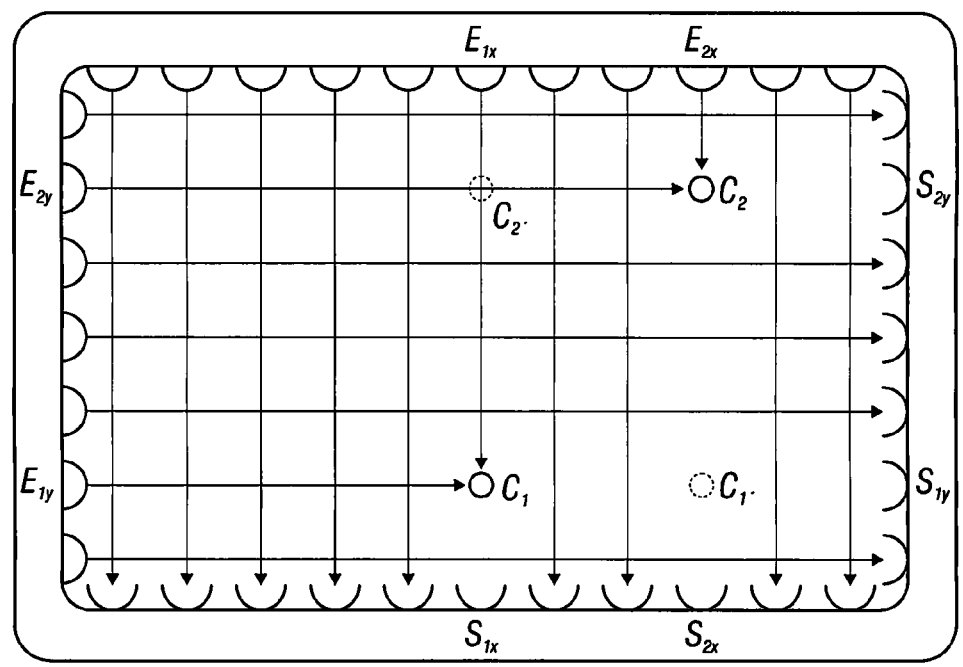
FIG. 1 shows is a schematic diagram that shows a prior art infrared break-beam, grid-based touch sensor for determining the coordinates of two contact locations.

As noted above, cost and reliability often motivate the use of a grid-based sensor in touch detecting displays that, as shown in FIG. 1, typically returns contact information in the form of a bounding box enclosing the detected contact locations. Defining a set of gestures in terms of the bounding box position, shape, motion, and deformation is therefore of great benefit.

Figure 3A:
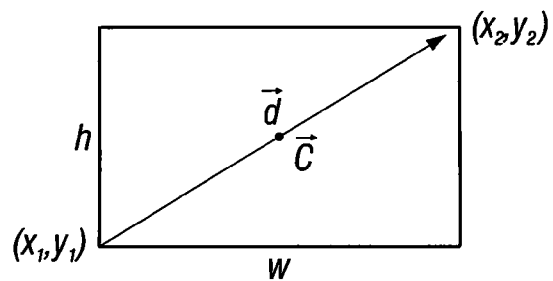
FIGS. 3a-3d shows several gestures identified based on bounding box position, shape, motion, and deformation according to the invention.

FIGS. 3a-3d show several gestures identified based on bounding box position, shape, motion, and deformation according to the invention. As shown in FIG. 3a, the contact information returned by the grid-based touch sensor is summarized by a bounding box described, by convention, by the coordinates of the lower left $(x_1,y_1)$ and upper right $(x_2,y_2)$ corners of the bounding box. The invention uses this information to identify the user gestures. Generally, gestures may be identified based on any of the center, aspect ratio, diagonal, length of the diagonal, and orientation of the diagonal of the bounding box. Gestures may also be identified based on the changes over time of any of these quantities.

Figure 3B:
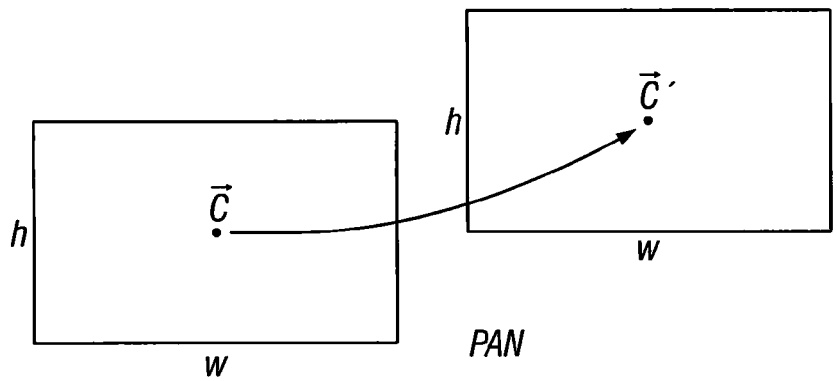
Figure 3C:
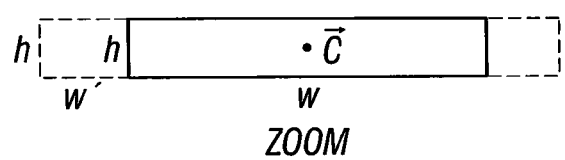
Figure 3D:
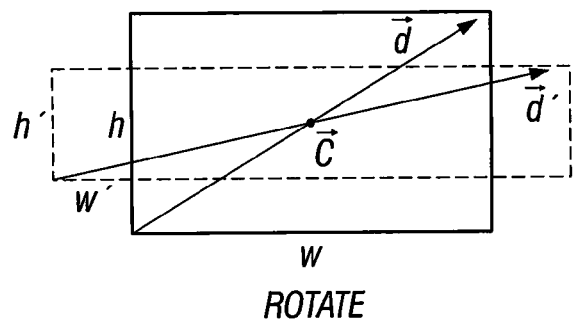

In the preferred embodiment of the invention, gestures are identified using the procedure detailed below and illustrated in FIGS. 3b-3d. Upon receipt of a bounding box from the touch sensor:

1. The bounding box width w, height h, center $\vec{C}$, and diagonal $\vec{d}$, are determined based on the corners of the bounding box.
2. The aspect ratio of the bounding box $$A = \frac{h}{w}$$

and the stretch factor of the bounding box $$S = \max\left[A, \frac{1}{A}\right]$$

are determined.
3. The rate of change of each of these parameters is determined based on a history of each parameter. More specifically, $\dot{w}$, $\dot{h}$, $\dot{\vec{C}}$, and $\dot{\vec{d}}$ are determined, where $\dot{Q}$ denotes the first derivative with respect to time of the quantity Q. The time derivatives may be computed using one or more of the previous parameter values, that is, using first or higher order derivative approximations.
4. The rate of change of the minimum and maximum of the length and width $$\frac{d}{dt}(\min[w, h])$$

and $$\frac{d}{dt}(\max[w, h])$$

are determined. The time derivatives may be computed using one or more of the previous parameter values, that is, using first or higher order derivative approximations.
5. Then,
If $\dot{w}<\epsilon_l$, $\dot{h}<\epsilon_l$, and $|\dot{\vec{C}}|\geq\epsilon_c$, that is, if the bounding box is moved significantly but not deformed significantly, a pan gesture is identified.
If $S>1+\epsilon_S$, $$\left|\frac{d}{dt}(\min[w, h])\right| < \varepsilon_l,$$

and $$\left|\frac{d}{dt}(\max[w,h])\right| \geq \varepsilon_l,$$

that is, if a stretch factor of an already stretched bounding box is increased or decreased significantly, a zoom gesture is identified.

If $|\dot{w}| \geq \epsilon_l$, $|\dot{h}| \geq \epsilon_l$, and $|\vec{C}| < \epsilon_c$, that is, if the bounding box is deformed significantly but not moved significantly, a rotate gesture is identified.

Else, no gesture is identified.

$\epsilon_l$ and $\epsilon_c$ are predetermined thresholds corresponding to the ability of a typical user to hold the corresponding bounding box parameter constant while executing a gesture. $\epsilon_S$ is a minimum stretch factor above which gestures may be considered an inward or outward zoom. The values of the thresholds may be adjusted to yield a desired gesture classification behavior.

After a gesture is identified, a display command consistent with the identified gesture is determined, and the display is updated appropriately. In the preferred embodiment of the invention:

If a pan gesture is identified, the display is translated at constant magnification and orientation in the direction of $\dot{\vec{C}}$ at a rate proportional to $|\dot{\vec{C}}|$;

If a zoom gesture is identified, the magnification of the display is increased or decreased about the center of the display at a rate proportional to $$\left|\frac{d}{dt}(\max[w,h])\right|.$$

Alternatively, the display the magnification of the display may be changed about the current bounding box center $\vec{C}$; and If a rotate gestures is identified, the display is rotated about the center of the display at a rate proportional to $$\frac{d}{dt}(\angle \vec{d}).$$

Preferably, the display is rotated about its center. Alternatively, the display may be rotated about the current bounding box center $\vec{C}$.

In the preferred embodiment of the invention, the identification procedure is performed upon or shortly after initiation of contact by the user. Once the gesture has been identified, the identification is maintained until the contact is terminated. Throughout the duration of the contact, the display is continually updated, preferably each time updated bounding box information is received from the touch sensor. Initiation and termination of the single gesture are therefore determined based upon the appearance and disappearance of the bounding box, which is typically an event explicitly declared by the touch sensor.

Experimentation has indicated that such a rigid gesture classification is preferred by users, because it is difficult in practice to execute gestures that are purely of one type. Classifying the bounding box motion and deformation as a gesture of one type averts the frustration experienced by a user when, for example, an attempt to zoom results in both a zooming and a rotating motion of the display.

Nonetheless, in an alternative embodiment of the invention, the identification procedure is performed more frequently. For example, the identification procedure may be performed each time updated bounding box information is received from the touch sensor. In this approach, a single user motion, as delineated by the appearance and disappearance of a bounding box, potentially contains pan, zoom, and rotate gestures. Over the duration of the gesture, the display is updated with a combination of panning, zooming, and rotational motions that, to the user, appear smooth and continuous. Successful implementation of this embodiment requires especially careful selection of the thresholds $\epsilon_l$, $\epsilon_c$, and $\epsilon_S$.

In the above gesture identification procedure, the gesture for rotation remains partly ambiguous. Specifically, the direction of rotation cannot be determined from the bounding box alone. The pairs of points $[C_1, C_2]$ and $[C_{1'}, C_{2'}]$ of FIG. 1 that possibly define the bounding box result in opposite directions of rotation. This ambiguity may be addressed through a number of approaches. In one approach, users adopt a convention of designating the bounding box with the lower left and upper right corners, or the upper left and lower right corners. In another approach, the gesture identification procedure assumes a single direction of rotation, regardless of the actual points of contact. In yet another approach, the ghosting effect of FIG. 1 may be truly disambiguated. In the case of grid-based sensors, for example, the true points of contact typically provide a stronger signal than do the ghost points of contact. The relative strength of the pairs of points $[C_1, C_2]$ and $[C_{1'}, C_{2'}]$ may be used to determine the true contacts and therefore the correct direction of rotation. Finally, a measurement of the torque applied to the display surface may be made to ascertain directly the direction of rotation implied by the user gesture.

It should be noted that although the invention is described above with reference to a bounding box defined by two contact locations, the bounding box may also be defined for the case of three or more contact points. For a set of contact points $C_i$ defined by contact locations $(x_i, y_i)$, the bounding box is defined by the corners $(\min[x_i], \min[y_i])$ and $(\max[x_i], \max[y_i])$.

While the description herein references a grid-based sensor incorporating a series of infrared emitters and receivers, the invention is equally applicable to other grid-based sensors. For example, the invention may be used with laser break-beam grids, resistive grids, capacitive grids, and arrays of acoustic, e.g. ultrasonic, emitters and microphones. The invention may also be used with non-grid-based sensors that return contact information in the form of a bounding box.

Finally, while the invention is described with reference to a rectangular bounding box, alternative embodiments of the invention may used non-rectangular bounding boxes. For example, a touch sensor incorporating corner based sensors that determine an angular bearing to each point of contact may return contact information in the form of a quadrilateral bounding box. The techniques described herein can be applied to a generalized quadrilateral bounding box with appropriate definition of a bounding box center, width, height, aspect ratio, and diagonal. The invention may thus be used in conjunction with sensors that are not strictly grid-based.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following Claims.

The invention claimed is:

1. In an interactive display, a method for identifying a specific user gesture comprising the steps of:
    displaying imagery on an imaging surface;
    responsive to a user contacting a touch sensor, detecting a plurality of contact locations at which the user contacts the touch sensor to control said display;
    responsive to a determination that a motion of a bounding box enclosing at least two of said plurality of contact locations exceeds a predetermined motion threshold and that deformation of said bounding box is less than a predetermined deformation threshold, said determination that said motion of the bounding box enclosing said at least two of said plurality of contact locations exceeds said predetermined motion threshold and that deformation of said bounding box is less than said predetermined deformation threshold being based on rates of change of particular parameters of said bounding box, identifying said specific user gesture as a pan gesture;
    associating said specific user gesture with a display command; and
    executing said display command to alter the display of said imagery.

2. The method of claim 1, wherein said display command affects a translation of said imagery.

3. An interactive display comprising:
    means for displaying imagery on an imaging surface;
    a touch sensor corresponding to said imaging surface;
    means for detecting, responsive to a user contacting said touch sensor, a plurality of contact locations at which the user contacts said touch sensor to control said display;
    means for identifying a pan gesture, comprising:
        means for determining if a motion of a bounding box surrounding at least two of said contact locations is greater than a predetermined motion threshold; and
        means for determining if a deformation of said bounding box is less than a predetermined deformation threshold;
        wherein said means for determining if said motion of the bounding box surrounding at least two of said contact locations is greater than the predetermined motion threshold and said means for determining if said deformation of said bounding box is less than a predetermined deformation threshold are configured to determine, based on rates of change of particular parameters of said bounding box, if said motion of the bounding box surrounding at least two of said contact locations is greater than said predetermined motion threshold and if said deformation of said bounding box is less than a predetermined deformation threshold;
    means for associating said pan gesture with a corresponding display command; and
    means for executing said display command to alter the display of said imagery.

4. An interactive display comprising:
    means for displaying imagery on an imaging surface;
    a touch sensor corresponding to said imaging surface;
    means for detecting, responsive to a user contact with the touch sensor, a plurality of contact locations at which the user contacts said touch sensor to control said display;
    means for identifying a specific user gesture among a plurality of user gestures based on a bounding box surrounding at least two of said contact locations comprising:
        means for identifying a pan gesture, wherein said means for identifying a pan gesture comprises:
            means for determining if a motion of said bounding box is greater than a predetermined motion threshold; and
            means for determining if a deformation of said bounding box is less than a predetermined deformation threshold;
            wherein said means for determining if said motion of said bounding box is greater than said predetermined motion threshold and said means for determining if said deformation of said bounding box is less than said predetermined deformation threshold are configured to determine, based on rates of change of particular parameters of said bounding box, if said motion of said bounding box is greater than said predetermined motion threshold and if said deformation of said bounding box is less than said predetermined deformation threshold;
        means for identifying a zoom gesture; and
        means for identifying a rotate gesture;
    means for associating said specific user gesture with a corresponding display command; and
    means for executing said display command to alter the display of said imagery.

5. A non-transitory machine-readable medium comprising instructions which, when executed by a machine, cause the machine to perform operations comprising:
    displaying imagery on an imaging surface of an interactive display;
    responsive to a user contacting a touch sensor associated with the imaging surface to make a specific user gesture, detecting a plurality of contact locations at which the user contacts the touch sensor to control said display;
    responsive to a determination that a motion of a bounding box enclosing at least two of said plurality of contact locations exceeds a predetermined motion threshold and that deformation of said bounding box is less than a predetermined deformation threshold, said determination that said motion of the bounding box enclosing said at least two of said plurality of contact locations exceeds said predetermined motion threshold and that deformation of said bounding box is less than said predetermined deformation threshold being based on rates of change of particular parameters of said bounding box, identifying said specific user gesture as a pan gesture;
    associating said specific user gesture with a display command; and
    executing said display command to alter the display of said imagery.

6. An interactive display comprising:
    an imaging surface for displaying imagery;
    a touch sensor associated with the imaging surface, the touch sensor being configured to
        detect a plurality of contact locations at which a user contacts the touch sensor to control said interactive display, and
        identify said specific user gesture as a pan gesture responsive to a determination that a motion of a bounding box enclosing at least two of said plurality of contact locations exceeds a predetermined motion threshold and that deformation of said bounding box is less than a predetermined deformation threshold, said determination that said motion of the bounding box enclosing said at least two of said plurality of contact locations exceeds said predetermined motion threshold and that deformation of said bounding box is less than said predetermined deformation threshold being based on rates of change of particular parameters of said bounding box; and a processor configured to associate said specific user gesture with a display command and to execute said display command to alter the display of said imagery.

7. An interactive display comprising:

means for displaying imagery on an imaging surface of an interactive display;

means for detecting a plurality of contact locations at which a user contacts a touch sensor to control said means for displaying, responsive to the user contacting the touch sensor to make a specific user gesture;

means for identifying said specific user gesture as a pan gesture responsive to a determination that a motion of a bounding box enclosing at least two of said plurality of contact locations exceeds a predetermined motion threshold and that deformation of said bounding box is less than a predetermined deformation threshold, said determination that said motion of the bounding box enclosing said at least two of said plurality of contact locations exceeds said predetermined motion threshold and that deformation of said bounding box is less than said predetermined deformation threshold being based on rates of change of particular parameters of said bounding box;

means for associating said specific user gesture with a display command; and means for executing said display command to alter the display of said imagery.

* * * * *